United States Patent [19]

Dimalanta

[11] Patent Number: 5,754,272
[45] Date of Patent: May 19, 1998

[54] MACHINE FOR MARKING PROGRESSIVE OPTICAL LENS

[75] Inventor: Rodrigo P. Dimalanta, Oceanside, Calif.

[73] Assignee: Optix Instruments, Torrance, Calif.

[21] Appl. No.: 550,598

[22] Filed: Oct. 31, 1995

[51] Int. Cl.$^6$ .................................. A61B 3/10; G01B 1/00
[52] U.S. Cl. ........................................ 351/204; 33/507
[58] Field of Search .................................. 351/200, 204, 351/246, 221, 169, 171, 177; 33/200, 507

[56] References Cited

U.S. PATENT DOCUMENTS

| | | | |
|---|---|---|---|
| 4,196,978 | 4/1980 | Johnson | 351/204 |
| 5,394,617 | 3/1995 | Tucker | 33/507 |
| 5,470,892 | 11/1995 | Gupta et al. | 522/42 |

*Primary Examiner*—Huy Mai
*Attorney, Agent, or Firm*—Roger A. Marrs

[57] ABSTRACT

A machine for marking the location for determining the correct prescription of progressive optical lens including a light beam, a table for supporting the progressive lens in the light beam, an optical protractor having visible indicia thereon for contact against the progressive lens to locate the symbols on the lens that indicate the position of the reference line thereon, and a stamp including adjustable stamp pads for contact against the lens in alignment with a reference line, to apply at least one temporary opaque symbol on the progressive lens from which the lens prescription can be determined.

20 Claims, 6 Drawing Sheets

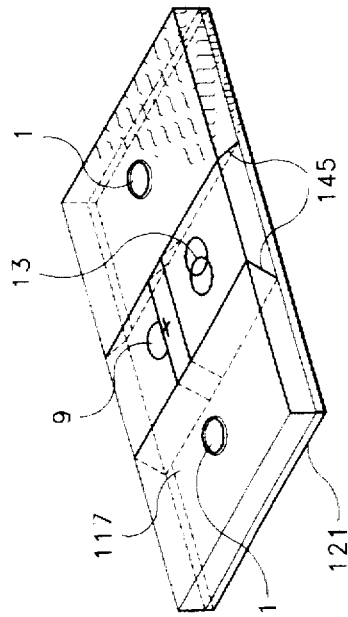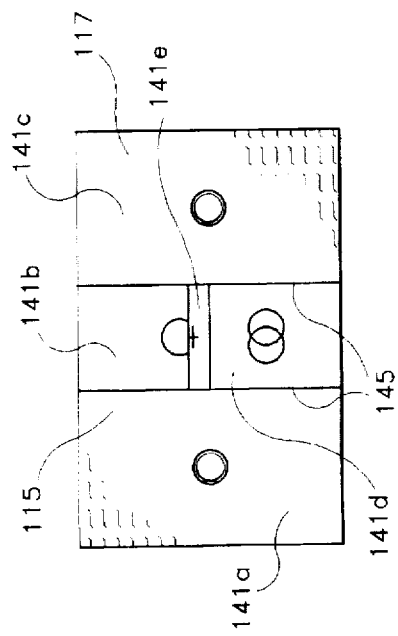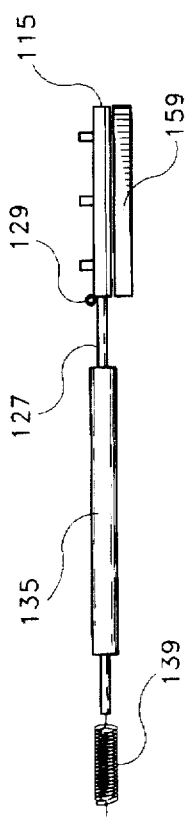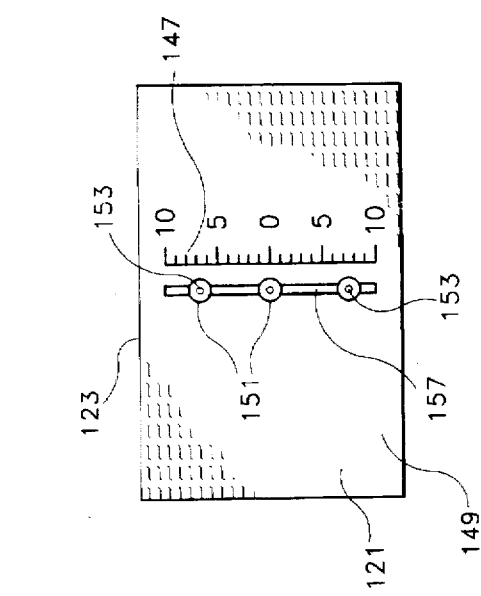

MACHINE FOR MARKING PROGRESSIVE OPTICAL LENS

BACKGROUND OF THE INVENTION

1. Field of the Invention

This invention pertains to the field of optical equipment. More particularly, the invention pertains to a machine for locating the exact spots on progressive optical lens where the correct prescription of the lens can be read with a lensometer.

2. Description of the Prior Art

"Eyeglasses" is the formal term given to a pair of glass or plastic optical lenses held in a frame for wearing on one's face to correct vision deficiencies or shade the eyes from sunlight or other bright sources. They have been in man's culture for more than a century and are worn by a majority of the human population. Eyeglasses may be wire framed or plastic framed, use round or various shaped lenses, and are priced from a few to a few hundred dollars. While performing the basic function of focusing objects for view by the wearer, they have become a fashion statement as well. Overall, eyeglasses are here to stay.

It is not uncommon for the owner of eyeglasses to venture into an optical store to buy a replacement or an additional "pair" of eyeglasses as they are called. Sales programs and merchandising of eye wear is as common place as virtually any other item of apparel so that buying extra eyeglasses is a common practice. While most people remember their dress, pants and shoe size, unfortunately, they do not remember, let alone even know, their eyeglasses prescription. Accordingly, each optical shop must be prepared to determine the prescription from the eyeglasses themselves. A machine, called a "lensometer", is customarily used in optical shops to determine the prescription. The eyeglasses are placed in the lensometer and the necessary parameters, such as the number of diopters, focal length and power are read from the machine.

A common form of eyeglasses is the bifocal eyeglass. This is a lens with two distinct areas, one in the lower part of the lens for close work, reading, etc., and the other area, somewhat surrounding the sides and above the lower part for distance observation. These eyeglasses have two distinct prescriptions, each obtainable from using the lensometer. A "trifocal" lens is also common, using three separate lens, one for distance, one for close work and a third for intermediate focusing. Therefore, the standard single lens and the separate or "straight line" bifocals and trifocals are easily reproduced by using the lensometer to determine the prescription for each lens.

A rather newcomer to the bifocal eyeglass field is what is known as the "progressive" bifocal. This item uses two lens, one for distance and one for close work; however, there is no visual line of separation between the lens and they are blended together over a short distance, hence the term "progressive". Because there is no observable line of division between the two lens, use of the lensometer is restricted to certain areas of the lens where the true prescriptions, as opposed to the transitional area prescription, may be viewed and the parameters determined. In order to locate the place on the lens where these prescriptions can be accurately read, manufacturers of progressive lens have created an international standard. This standard is based upon a horizontal "reference" line that is determinable from observation of two symbols, such as small circles or squares, set in spaced-apart arrangement on the lens that are very lightly laser engraved on the lens so that the "reference" line may be hypothetically drawn between them. Each manufacturer of progressive lens then sets its area for lensometer viewing in a small circle, usually above and below the "reference" line.

For instance, FIGS. 1a, 1b and 1c show different manufacturers' directions as to where to view the bifocal, close-up lens with the lensometer. The symbols 1 are laser engraved on the lens 3 with such a light touch that one can observe them with the naked eye only by knowing where to look and then viewing them in an appropriate beam of light. A hypothetical horizontal line (shown in dotted line in FIG. 1a only for demonstration purposes) shows the reference line 5. The cross located slightly above the center of reference line 5 is called the "fitting cross" 7 where the pupils of the wearer's eyes must be located for the eyeglasses to be properly fitted. The circle above fitting cross 7 is the "distance" reference 9 which is where the lensometer must be placed to accurately read the prescription of the upper lens. The circle 13 located below the reference line is the place where the lensometer must be placed to accurately read the prescription of the bifocal, close-work lens. Note in FIG. 1a the manufacturer indicates that circle 13 is 16 mm below the reference line; in FIG. 1b, it is 12 mm below the line; and, in FIG. 1c it is 17 mm below line 5.

Only symbols 1 are actually marked on the lens. All other points or circles are located by measurement, in millimeters, from reference line 5 which itself is not marked on the lens. Without a full guide to each lens, one can never be sure a progressive lens has the correct prescription. For this reason, many optical shops refuse to provide replacement or spare eyeglasses of the progressive lens type by measuring the prescription from the lens.

SUMMARY OF THE INVENTION

This invention is a machine for locating symbols 7, 9 and 13 on progressive optical lens so that the eyeglasses may be transferred, without more, to the lensometer and the symbols used as the targets for the lensometer from which to determine the exact prescription of the distance and the close-up lens. This invention also can be used to locate other symbols such as the lazer engravings 1 for use by the optician as he/she sees fit.

The invention comprises a light beam, a first means for supporting the progressive lens in the light beam, an optical protractor having visible indicia thereon for contacting the progressive lens to locate symbols 1 on the lens to further indicate the position of the reference line 5. A stamp, including adjustable stamp pads, is provided for contact against the progressive lens, in alignment with the reference line, to apply at least one temporary opaque symbol, such as circle 13, on the progressive lens from which the lens prescription can be viewed with the lensometer. The machine is simple in design, rugged in construction and is compact for easy storage. It contains pivotal members that may be brought into play and is tiltable to provide convenience to the operator. It can be used with virtually any progressive lens in the industry provided the operator has with him or her a set of instructions from each lens manufacturer, such as shown in FIGS. 1a, 1b and 1c to provide directions for locating circle 13.

Accordingly, the main object of this invention is a machine for rapidly and accurately locating the correct area for obtaining the prescription of progressive lenses. Other objects of the invention include a machine for marking the symbols used by various manufacturers to establish the reference line on progressive lenses; a machine for locating the fitting cross with respect to the reference line and the symbols; a machine for locating and marking the distance reference of the lens for obtaining the prescription thereof using a lensometer; a machine that is small and compact in design, rugged in construction and easily stored when not in use; a machine that may be used by a wide variety of personnel with a limited amount of training; and, a machine that will provide far greater capacity of optical stores to match new eyeglasses with those of persons bringing existing eyeglasses into the shop.

These and other objects of the invention may be observed by reading the following description of the preferred embodiment in conjunction with the drawings appended hereto. The scope of protection sought by the inventor may be gleaned from a close reading of the Claims that conclude this specification.

DESCRIPTION OF THE DRAWINGS

FIGS. 6a, 6b and 6c are illustrative views of the stamp pad usable in this invention; and, FIGS. 7a and 7b are side illustrative views of the steps of inking the stamp pad and then marking the lens of the eye glasses with the pad to locate the area for later use by the lensometer.

DESCRIPTION OF THE PREFERRED EMBODIMENT

Figure 1:
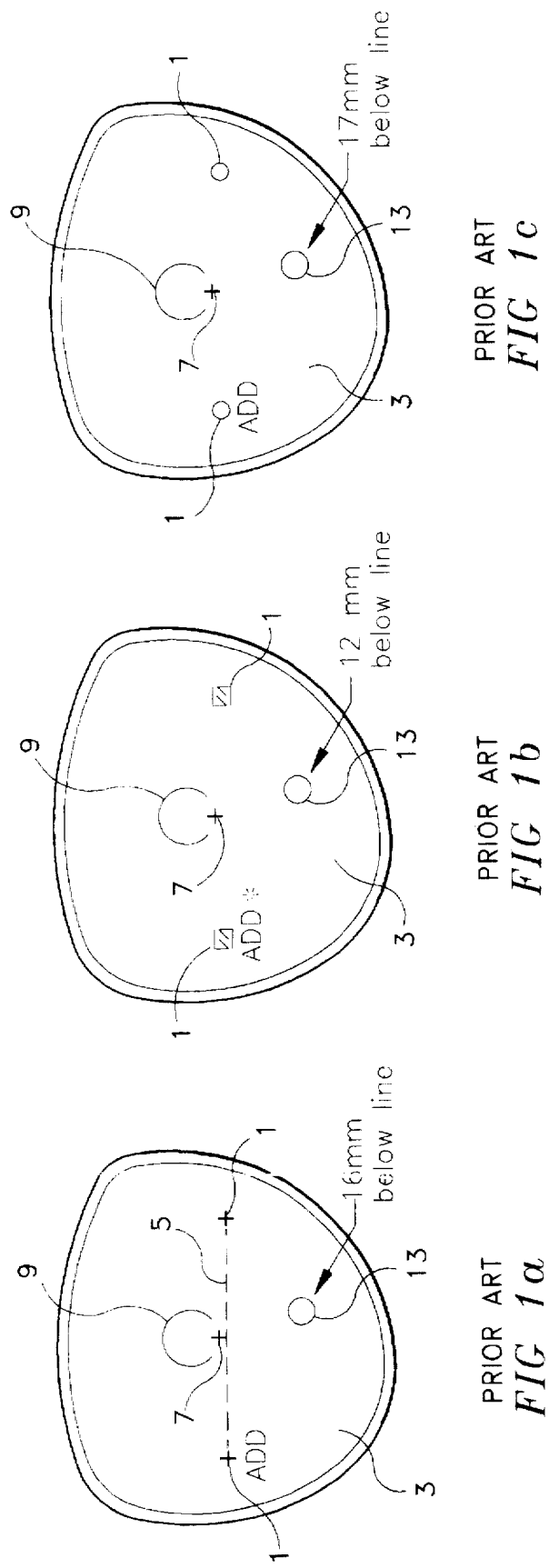
FIGS. 1a, 1b and 1c are reproductions of prior art directions from various progressive lens manufacturers as to the location of various symbols and circles on their particular lens.
Figure 2:
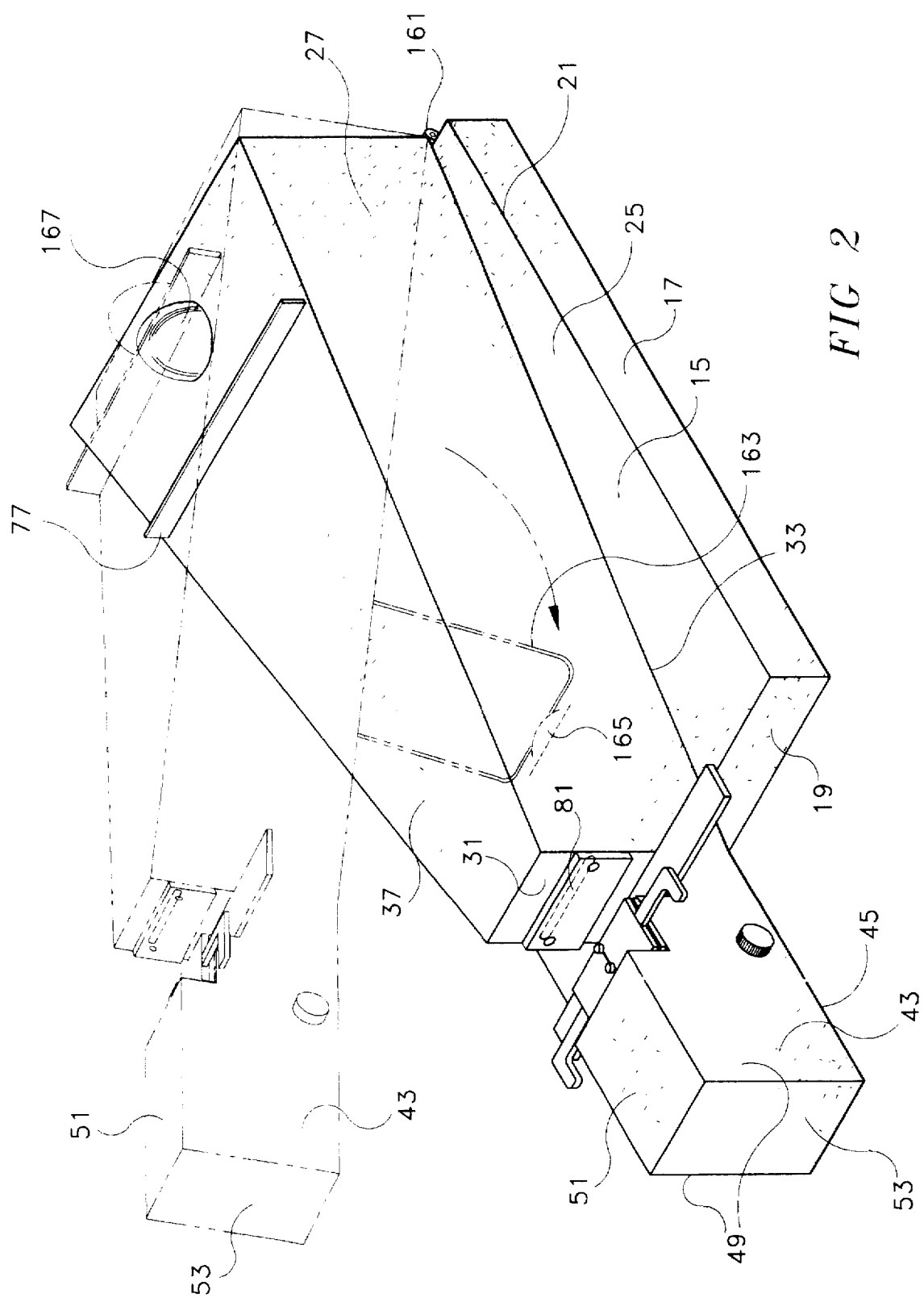
FIG. 2 is a isometric view of the preferred embodiment of the machine of this invention showing it in the stored position (solid line) and in the raised, operative position (broken line)
Figure 3:
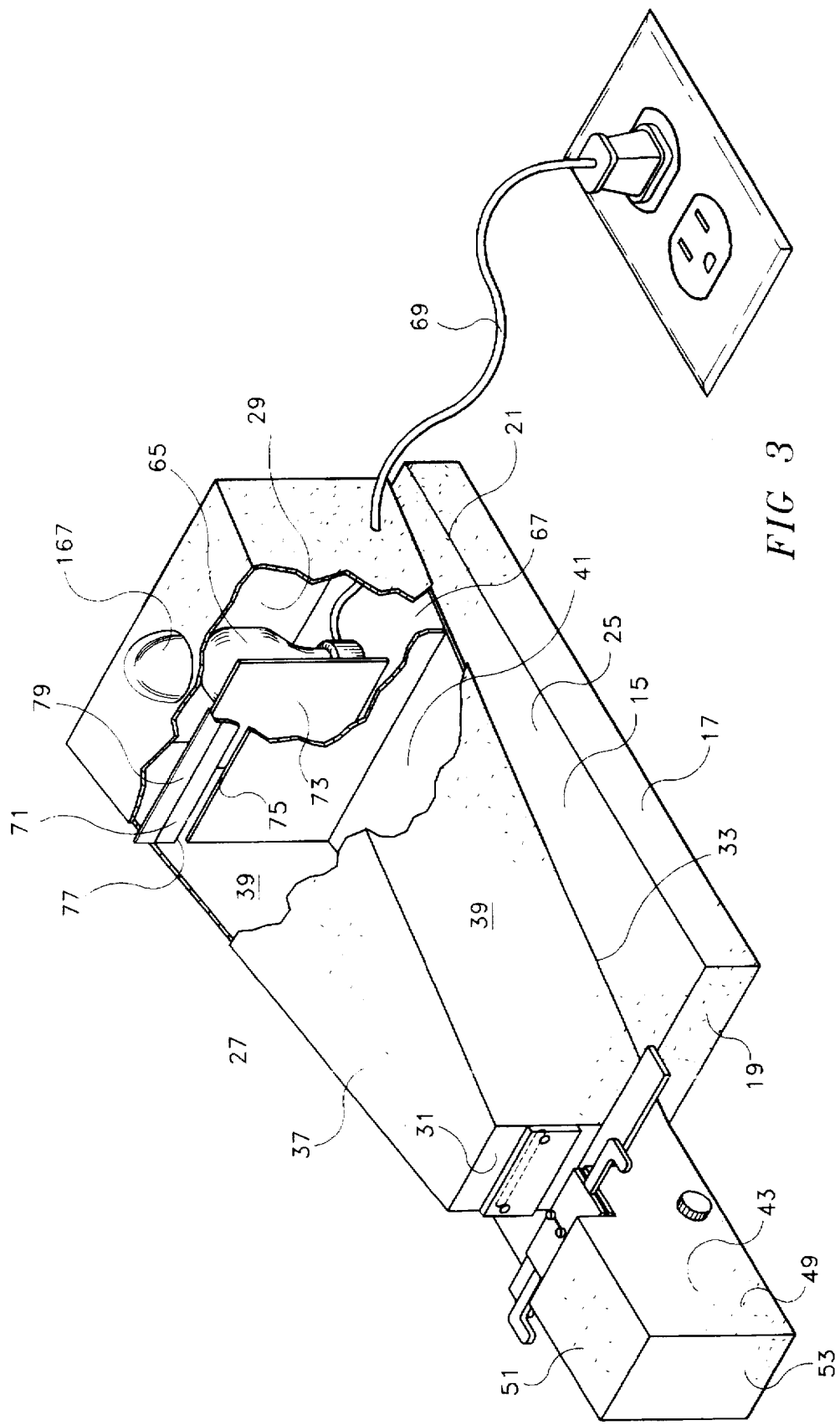
FIG. 3 is a close-up, partly broken away view of the interior of the rear portion of the embodiment shown in FIG. 2.

Turning now to the drawings wherein like elements are identified with like numerals throughout the 12 figures, FIGS. 2 and 3 show the preferred embodiment of the machine of this invention to comprise a base 15 defined by a pair of upstanding spaced-apart elongated side walls 17 and a pair of upstanding spaced-apart shorter end walls 19 joined together along their respective end edges to form a rectangular perimeter 21 that is topped by a flat plate 25 that is interconnected said perimeter along its respective mating edges therewith. Base 15 may be made from any convenient material, including wood, metal and plastic and preferably is made rather heavy and sturdy to support the rest of the machine constructed thereabove.

A casing 27 is located above and contiguous with base 15 and is defined by a large upstanding rear plate 29 and a smaller upstanding front plate 31 spaced apart therefrom. Said rear plate 29 and said front plate 31 extend upward from a base plate 33 and support a top plate 37 spaced apart from said base plate. A pair of spaced-apart side walls 39 extend from rear plate 29 forward to front plate 31, converging as they do, and are joined to base plate 33 and top plate 37 along their respective side edges to form a fully enclosed, light-tight, elongated hollow interior 41. A short, enclosed area 43 extends forward from front plate 31 and is outlined by a base wall 45, extending forward from casing base plate 33, and a pair of spaced apart upstanding side walls 49 and topped by a horizontal top wall 51, all said walls enclosed by a front wall 53 to form an enclosed extension of the machine.

Figure 4:
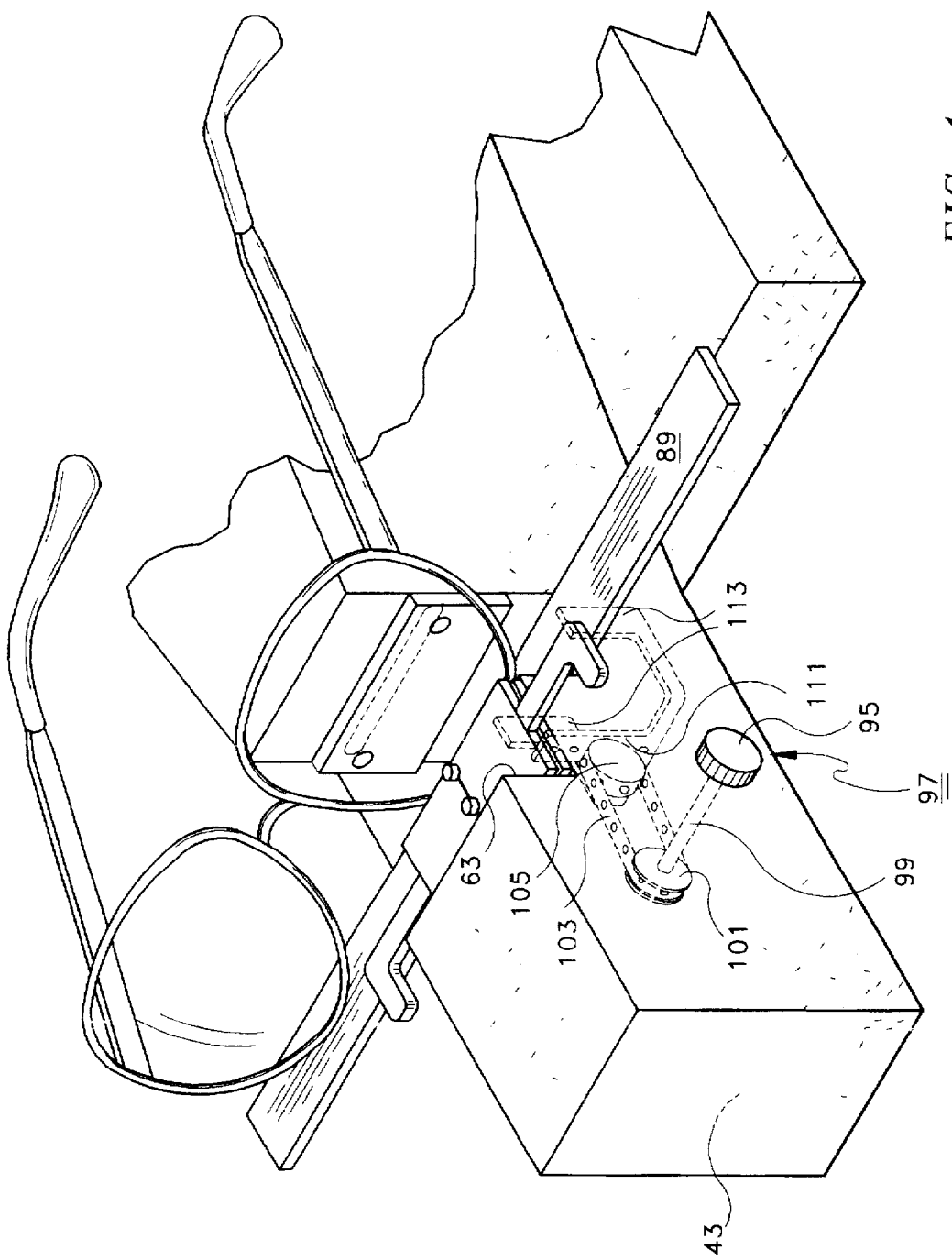
FIG. 4 is a close-up view of the forward portion of the embodiment shown in FIG. 2 showing a pair of eye glasses in operative position thereon and further showing in hidden lines the details of one embodiment of the table adjustment means.
Figure 5:
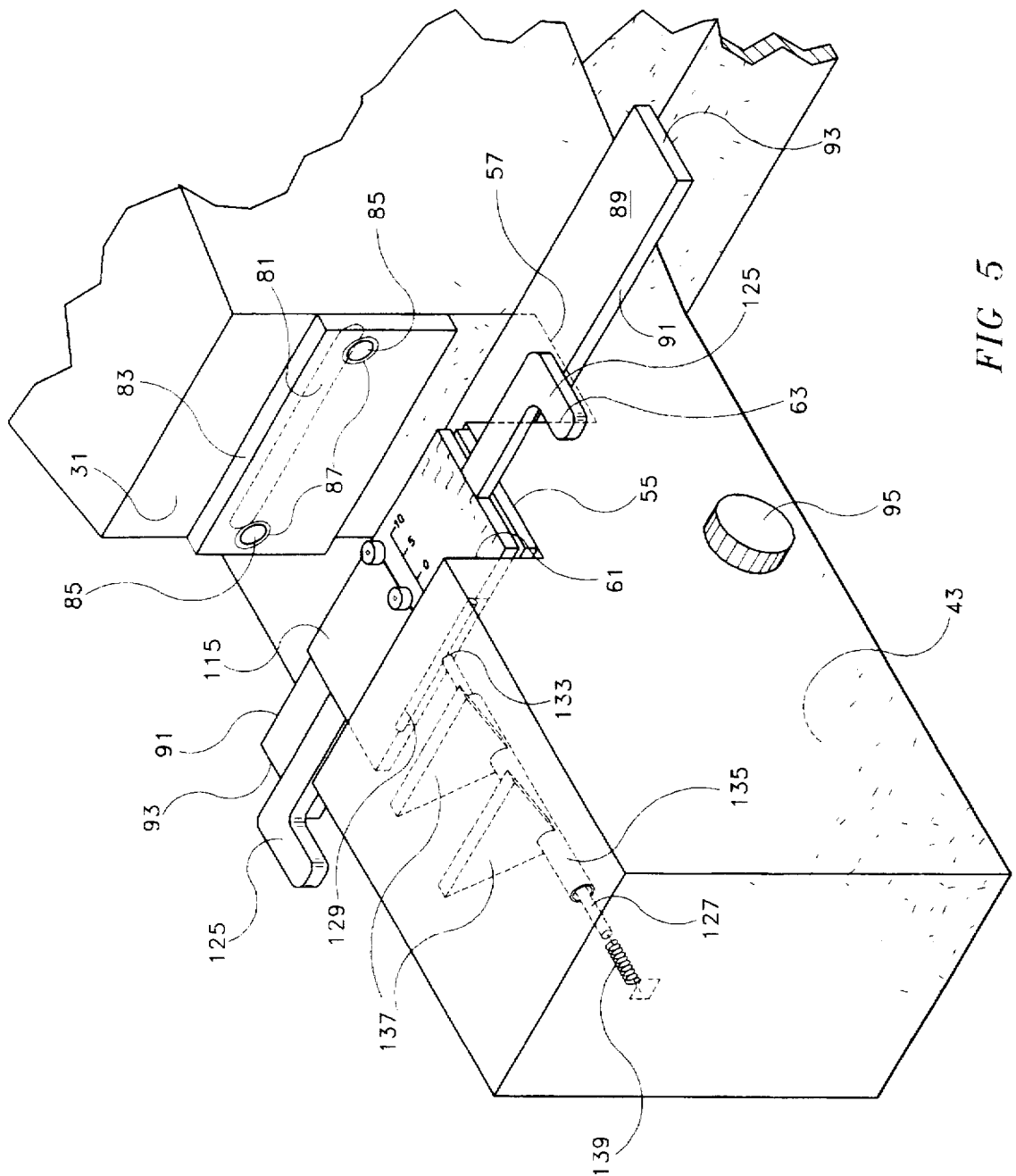
FIG. 5 is another close-up, partly broken away view of the forward portion of the embodiment shown in FIG. 2 showing in hidden lines the rectilinear movement mechanism for the stamp pad.

As shown in FIGS. 4 and 5, between said front plate 31 and said extension or short enclosed area 43 lies a pair of horizontal shelves 55 and 57, respectively, set in step-like arrangement by vertical walls 61 and 63, respectively. Casing 27 is conveniently constructed from sturdy, fireproof material, including wood, metal and plastic and preferably is thin-walled to reduce weight.

A light source 65 is located inside casing 27, FIG. 3, inboard from rear plate 29, in a walled-off area 67, for the purpose of generating a beam of light for passage through said hollow interior portion 41 to said front plate 31. Light source 65 is preferably an electric lamp and preferably of the fluorescent or halogen type. Light source 65 is connected to an electric conductor 69 that exits casing 27 for attaching to regular household or office current. To control the amount of light generated by light source 65, for passage through interior portion 41, an adjustable shutter 71 is provided interior said casing. Shutter 71 comprises a diffuser 73 (to spread the light into a uniform pattern), fixed opaque edge 75 and a moveable opaque edge 77 in parallel juxtaposition therewith (to narrow the beam of light passing therethrough), said latter moveable edge attached to an arm 79 extending outside casing 27 for manipulation by the user to adjust the two edges to the desired degree of separation thus controlling the size of the light beam passing therethrough.

To reduce the absorption by the walls of walled-off area 67, they are painted white or silver to reflect the maximum amount of light. To maximize the beam of light passing through elongated hollow interior 41, the walls are preferably painted black.

As shown in FIGS. 2 and 5, front plate 31 has formed therein a wide, narrow slit 81 that is horizontally arranged to allow the beam of light from light source 65 to pass therethrough and out beyond said plate. Over slit 81, exterior elongated hollow interior 41, is removeably mounted an optical protractor 83 having a pair of apertures 85 formed therein for use as hereinafter set forth. Preferably, protractor 83 is made transparent and symbols 87 are printed thereon in place of apertures 85 and said protractor removeably mounted on the exterior surface of front plate 31 such as by small hooks or bayonet clips or the like.

As shown in FIG. 5, exterior and adjacent front plate 31 and below slit 81 is positioned an adjustable table 89. Table 89 is defined by a pair of elongated side edges 91 and a pair of shorter end edges 93 that together form the perimeter thereof. Table side edges 91 should be as long as the width of 1½ standard pair of eyeglasses. Table 89 is adjustable in height below slit 81 which is controlled by a turnable exterior knob 95. As shown in FIG. 4, a means 97 for adjusting the height of table 89 is provided interior of short enclosed area 43 and is shown to comprise a drive shaft 99 extending inward from knob 95, a drive wheel 101 concentrically attached in fixed position to said drive shaft 99, and a drive belt 103 extending from about said drive wheel 101 to a driven wheel 105 spaced apart therefrom that in turn drives a rack and pinion 111 connected to support arms 113 that support table 89. By turning knob 95, said table 89 is caused to rise and fall in front of slit 81.

As shown in FIGS. 5–7b, a moveable, flexible stamp 115 is provided spaced-apart from optical protractor 83 and in front of table 89. Stamp 115 is defined by a flat, but flexible, stamping surface 117 supported on a stamp body 121 that is defined by a rectangular perimeter 123 and having a handle 125 extending from both sides of said body for manipulating said stamp. Stamping surface 117 contains upstanding raised symbols 1 for applying ink to the lens of the eyeglasses as hereinafter more fully discussed.

Stamp 115 is controlled in its movement over an accurate rectilinear path from its resting place against step wall 61 by a rod 127 interconnected the rear of stamp body 121 through a hinge 129. Rod 127 extends inward through an aperture 133 formed in wall 61. Rod 127 is housed in a tube 135 to control the path of said rod to rectilinear movement into and out of aperture 133. Tube 135 is held in fixed position inside enclosed area 43 by clips 137 as shown. As shown in FIGS. 7a and 7b, a spring 139 is provided in said enclosed area 43 that is interconnected rod 127 and tube 135 to bias said stamp 115 against said wall 61 and away from said optical protractor 81.

Stamp 115 preferably contains a plurality of sub-stamps 141 that are moveable over stamp surface 117. As shown in FIGS. 6a, 6b and 6c, small sub-stamps 141a, 141b, 141c, 141d and 141e are defined by straight side 145 that have beveled edges as shown to interlock each sub-stamp in sliding interrelationship. A measurement scale 147 is printed or engraved on the rear surface 149 of stamp body 121 and a plurality of buttons 151 are interconnected some of the sub-stamps through short shafts 153 passing through a slot 157 formed in said body. The scale is marked off in units of measurement such as millimeters and buttons 151 can be moved over scale 147 to locate sub-stamps 141 at the appropriate place where the manufacturer designates as the location of the particular item.

An ink pad 159 is fixed to horizontal shelf 55 just below moveable stamp 115 in its resting position as shown in FIGS. 7a and 7b. Hinge 129 allows stamp 115 to be manipulated by handle 125 to be turned horizontal and pressed slightly downward onto said ink pad to load the inking surfaces with opaque ink. Handle 125 is then turned to raise stamp 115 into a vertical position and then be brought forward, by both handles 125 and against the bias pressure of spring 139, against the lens resting on adjustable table 89.

In operation, light source 65 is turned on and the progressive eyeglasses are set on adjustable table 89 as shown in FIG. 4 and knob 95 turned to raise the lens in front of slit 81. The light beam passing through slit 81 passes through the lens as well. Optical protractor 83 locates the symbols lightly printed or laser engraved on the lens and the user can locate them by looking from above short enclosed area 43 through the circles printed on optical protractor 83 into the beam of light. Reference is now made by the user to the appropriate chart of the manufacturer of the lens and the distance reference, fitting cross, reference line, and the progressive bifocal location can be determined from measurement from the reference line, usually in millimeters.

The location of these places from the charts can be used and sub-stamps 141 maneuvered by shifting buttons 151 on the back of stamp body 121. Stamp pad 115 can then be pulled along a rectilinear path from its resting place, using rod 127 to keep the motion accurate, and stamp surfaces 117 brought toward and into contact with the lens to temporarily mark the various locations. Thereafter, the eyeglasses can be shifted to the other lens and the same operation made to mark the various locations of importance and stamped as before. After stamping, stamp pad 115 is allowed to retract, under bias pressure from spring 139, to its resting place against wall 61 and out of contact with the lens.

In order to make the machine more user friendly, a hinge 161, shown in FIG. 2, is provided to hingedly connect casing 27 to base top plate 25 at the rear thereof and a support leg 163 pivotally attached to casing bottom plate 33 that can be unfolded from storage, between casing bottom plate 33 and base top plate 25, and moved to an upset 165 formed in base top plate 33 to angle casing 27 upward at the front end.

For convenience in operation, an aperture is formed in casing top plate 37, near rear plate 29, and covered with a translucent cover 167 to pass a small amount of light from light source 65 out from the top of the machine signifying when light source 65 is lit.

While the invention has been described by reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

What is claimed is:

1. A machine for marking the location for determining the correct prescription of progressive optical lens having symbols and a reference line comprising:

a) a light beam;
   b) a table for supporting the progressive lens in said light beam;
   c) an optical protractor having visible indicia thereon for contact against the progressive lens to locate the symbols on the lens that indicate the position of the reference line thereon; and,
   d) a stamp including flexible adjustable stamp pads with raised stamping symbols for contact against the lens in alignment with the reference line, to apply at least one temporary opaque symbol on the progressive lens from which the lens prescription can be determined.

2. The machine of claim 1 wherein said light beam includes a light source.

3. The machine of claim 2 wherein said light source is a fluorescent lamp.

4. The machine of claim 2 wherein said light source is a halogen lamp.

5. The machine of claim 1 further including a light source and a shutter for adjusting the amount of light emitted from said source.

6. The machine of claim 5 further including a slit, arranged spaced-apart from said source, for limiting the size of said light beam.

7. The machine of claim 6 wherein said optical protractor is transparent, mounted adjacent said slit, and arranged to have said visible indicia located in said light beam.

8. The machine of claim 1 wherein said table for supporting the progressive lens is adjustable.

9. The machine of claim 1 wherein a table for supporting the lens includes means for raising and lowering said shelf, including an exterior knob for twisting to change the height of said shelf.

10. The machine of claim 1 wherein said optical protractor is transparent to allow viewing therethrough for precise placement of said protractor adjacent the lens to locate the symbols on the lens.

11. The machine of claim 1 wherein said optical protractor is mounted across said light beam.

12. The machine of claim 1 further including an adjustable stamp pad for contact against the lens to apply an opaque symbol on the lens locating a fitting cross.

13. The machine of claim 1 further including an adjustable stamp pad for contact against the lens to apply an opaque symbol on the lens locating a distance reference.

14. The machine of claim 1 further including an adjustable stamp pad for contact against the lens to apply an opaque symbol on the lens locating a left lens prescription locale.

15. The machine of claim 1 further including an adjustable stamp pad for contact against the lens to apply an opaque symbol on the lens locating a right lens prescription locale.

16. The machine of claim 1 further including at least one scale from which to adjust a stamp pad for applying an opaque symbol with respect to the reference line.

17. The machine of claim 1 further including:
   a) a base;
   b) a casing defined by a first large end and a second smaller end spaced-apart therefrom, spaced-apart top and bottom walls extending between said first and second ends and opposed side walls extending from said first end and converging to said second end;
   c) said case pivoted at said first end to said base;
   d) a light source interior said first end for sending a light beam toward said second end; and,
   e) said second end having a slit formed therein for restricting the passage of said beam therethrough.

18. The machine of claim 17 wherein said casing is pivotally mounted to said base at said first end and including an adjustable support, spaced-apart from said pivotal mounting, to raise said casing at an angle with said base to facilitate easy use.

19. A machine for marking the location for determining the correct prescription of progressive optical lens having symbols comprising:
   a) a light source for generating a light beam;
   b) a casing including an elongated interior for confining said light beam said casing forming a slit at an end spaced-apart from said light source for passage of a narrow beam of light therethrough;
   c) a table for supporting the progressive lens in front of said slit so that said light beam passes through said lens;
   d) an optical protractor having visible indicia located thereon adjacent said slit for contact against the progressive lens for coinciding said indicia and the symbols on the lens to indicate the location of a reference line on said lens; and
   d) an ink stamp including flexible adjustable stamp pads with raised stamping symbols thereon for contact against the lens in alignment with the reference line, to apply at least one temporary opaque symbol on the progressive lens from which the lens prescription can be determined.

20. The machine of claim 19 further including a diffuser located between said light sight source and said slit for spreading the light beam into a uniform pattern.

* * * * *